US010274670B2

(12) United States Patent
Lee

(10) Patent No.: US 10,274,670 B2
(45) Date of Patent: Apr. 30, 2019

(54) REFRIGERATOR WITH SHELF LIGHTING

(71) Applicant: LG ELECTRONICS INC., Seoul (KR)

(72) Inventor: Seungho Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/963,714

(22) Filed: Dec. 9, 2015

(65) Prior Publication Data

US 2016/0161669 A1 Jun. 9, 2016

(30) Foreign Application Priority Data

Dec. 9, 2014 (KR) .......................... 10-2014-0176071

(51) Int. Cl.
*F21V 8/00* (2006.01)
*F25D 27/00* (2006.01)
(Continued)

(52) U.S. Cl.
CPC .......... *G02B 6/0095* (2013.01); *A47B 96/028* (2013.01); *F21V 23/02* (2013.01); *F25D 25/02* (2013.01); *F25D 27/00* (2013.01); *F25D 2400/40* (2013.01); *H01R 13/2421* (2013.01); *H01R 25/142* (2013.01); *H01R 2103/00* (2013.01)

(58) Field of Classification Search
CPC . F21V 23/02; F21V 8/00; F21V 23/06; F25D 27/00; F25D 23/067; F25D 2325/021; F25D 2400/40; G02B 6/0095; G02B 6/0021; A47B 96/027; A47B 96/028; F21Y 2103/10; F21Y 2115/10; H01R 13/2421

USPC .......................................................... 362/621
See application file for complete search history.

(56) References Cited

U.S. PATENT DOCUMENTS 5,450,297 A * 9/1995 Akashi ..................... F25D 27/00
312/236
5,508,898 A * 4/1996 McGovern ............... A47F 11/10
312/223.5
(Continued)

FOREIGN PATENT DOCUMENTS

CN 101846429 9/2010
CN 101858681 10/2010
(Continued)

OTHER PUBLICATIONS

European Search Report dated Apr. 18, 2016.
(Continued)

*Primary Examiner* — Hargobind S Sawhney
(74) *Attorney, Agent, or Firm* — Ked & Associates LLP

(57) ABSTRACT

A refrigerator with shelf lighting is provided that may include a refrigerator main body having a storage room, at least one shelf provided inside of the storage room, a light source provided at a rear end of the shelf, a power supply provided at a rear of the storage room, the power supply supplying power to the light source, and a light guide plate provided at the at least one shelf. The light guide plate may guide light of the light source to a front of the shelf. Accordingly, it is possible to reduce a length of an electric wire connecting the light source to the power supply and prevent the occurrence of glare caused by direct lighting.

10 Claims, 16 Drawing Sheets

(51) Int. Cl.
*F21V 23/02* (2006.01)
*A47B 96/02* (2006.01)
*F25D 25/02* (2006.01)
*H01R 103/00* (2006.01)
*H01R 13/24* (2006.01)
*H01R 25/14* (2006.01)

(56) References Cited

U.S. PATENT DOCUMENTS

| | | | | |
|---|---|---|---|---|
| 5,980,058 | A * | 11/1999 | Guess | F25D 27/00 362/155 |
| 6,813,896 | B1 | 11/2004 | Janke et al. | |
| 8,152,258 | B2 * | 4/2012 | Kang | F25D 25/02 108/108 |
| 9,127,874 | B2 * | 9/2015 | Ye | F21V 31/005 |
| 2005/0081547 | A1 * | 4/2005 | Avenwedde | F21V 23/06 62/264 |
| 2007/0109764 | A1 | 5/2007 | Bienick | |
| 2007/0127229 | A1 * | 6/2007 | Lee | F25D 25/02 362/92 |
| 2008/0236183 | A1 | 10/2008 | Iimura | |
| 2009/0021927 | A1 * | 1/2009 | Hall | F25D 25/02 362/92 |
| 2014/0140040 | A1 | 5/2014 | Giacomini et al. | |
| 2014/0217871 | A1 * | 8/2014 | Kerner | F25D 25/024 312/236 |
| 2014/0217879 | A1 * | 8/2014 | Kerner | F25D 27/005 312/408 |
| 2014/0224875 | A1 | 8/2014 | Slesinger et al. | |
| 2014/0320040 | A1 | 10/2014 | Katu et al. | |

FOREIGN PATENT DOCUMENTS

| | | |
|---|---|---|
| EP | 2 827 085 | 1/2015 |
| KR | 20-1999-0020218 | 6/1999 |
| KR | 10-0774518 | 11/2007 |
| KR | 10-2010-0066876 | 6/2010 |
| KR | 10-2011-0045445 | 5/2011 |

OTHER PUBLICATIONS

Korean Office Action dated Dec. 17, 2015.
Chinese Office Action dated Jul. 3, 2017 issued in Application No. 201510796350.8 (with English translation).

* cited by examiner

REFRIGERATOR WITH SHELF LIGHTING

CROSS-REFERENCE TO RELATED APPLICATION(S)

The present disclosure claims priority to Korean Application No. 10-2014-0176071, filed in Korea on Dec. 9, 2014, which is herein expressly incorporated by reference in its entirety.

BACKGROUND

1. Field

A refrigerator with shelf lighting is disclosed herein.

2. Background

A refrigerator is a device that stores food or other items at a low temperature, such that a fresh state of the food may be maintained for a longer time. FIG. 1 is a view showing an interior of a related art refrigerator. FIG. 2 is an enlarged sectional view of a connection area between a shelf and a power bus of the relative art refrigerator of FIG. 1. FIG. 3 is an enlarged view of a connector of FIG. 2. As shown in FIG. 1, a related art refrigerator includes a refrigerator main body 10 in which a freezing room 12 and a refrigerating room 14 are formed, and a door 20 that opens and closes the freezing room 12 and the refrigerating room 14. The door 20 includes a freezing room door 22 and a refrigerating room door 24. A refrigeration cycle device (not shown) is provided in the refrigerator main body 10 to provide cool air to the freezing room 12 and the refrigerating room 14.

A plurality of shelves 30 that divides an internal space of the refrigerating room 14 into a plurality of compartments 35a, 35b, and 35c is installed inside of the refrigerating room 14. Each of the plurality of shelves 30 may be configured to have a cantilever 32, to and by which only a rear end of the respective shelf is fixed and supported. Insertion projections 34 vertically spaced apart from each other are provided at the rear end of each shelf 30.

A fixing rail or shelf support 40 (hereinafter, referred to as 'shelf support 40') that supports the respective shelf 30 such that its height is adjustable is provided at a rear of the refrigerating room 14. The shelf support 40 has a plurality of coupling holes 42, into which the insertion projections 34 of the plurality of shelves 30 are inserted and coupled.

Temperature adjusters 37a, 37b, and 37c that adjust an amount of cool air discharged into the compartments 35a, 35b, and 35c, respectively, are provided in the compartments 35a, 35b, and 35c divided by the plurality of shelves 30, respectively. Shelf controllers 39 are provided at the plurality of shelves 30 to adjust temperatures of the compartments 35a, 35b, and 35c, respectively. Each shelf 30 has upper and lower insertion projections disposed to be vertically spaced apart from each other at the rear end of the shelf 30. A power bus 50 that enables the shelf controllers 39 and a controller (not shown) of the refrigerator main body 10 to be electrically connected to each other is provided at a rear of the shelf support 40.

The power bus 50 includes a housing 52 having an opening that communicates with each coupling hole 42 of the shelf support 40, and conductors 56a and 56b (power and common conductors) provided to be spaced apart from each other with a predetermined gap therebetween inside of the housing 52. A connector 60 inserted into the power bus 50 to be electrically connected to the conductors 56a and 56b is provided in any one of the insertion projections of each shelf 30.

The connector 60, as shown in FIG. 3, has terminals 62a and 62b respectively provided at both sides thereof. The terminals 62a and 62b contact the conductors 56a and 56b to be electrically connected to the conductors 56a and 56b, respectively. Wires 64a and 64b that electrically connect the terminals 62a and 62b and the shelf controller 39 to each other are connected to the terminals 62a and 62b, respectively.

According to the configuration described above, if the insertion projection 34 of the shelf 30 is inserted into the coupling hole 42 of the shelf support 40 at a desired height, the shelf 30 is supported at the desired height. If the insertion projection 34 of the shelf 30 is inserted into the coupling hole 42 of the shelf support 40, the connector 60 provided in the insertion projection 34 of the shelf 30 is inserted into and coupled to the power bus 50 provided at a rear of the coupling hole 42 by passing through the coupling hole 42. In this state, the terminals 62a and 62b of the connector 60 are respectively connected to the conductors 56a and 56b of the power bus 50, so that the shelf controller 39 of each shelf 30 is controllably electrically connected to the controller of the refrigerator main body 10.

However, in this related art refrigerator, the housing 52 of the power bus 50 is opened toward a front side of the refrigerator main body 10 to communicate with the coupling hole 42 of the shelf support 40, and the pair of conductors 56a and 56b are provided with the predetermined gap therebetween inside of the housing 52. Therefore, moisture may easily flow and penetrate into the gap between the conductors 56a and 56b, and a short circuit may occur due to the moisture.

Further, the housing 52 of the power bus 50 is opened forward to communicate with the coupling hole 42 of the shelf support 40, and therefore, a foreign substance may easily enter into the housing 52 through the opening. Furthermore, when the gap between the pair of conductors 56a and 56b of the power bus 50 and a distance between the two terminals 62a and 62b of the connector 60 are changed, a connection (contact) failure of the power bus 50 and the connector 60 may occur.

Also, the terminals 62a and 62b of the connector 60 of the shelf 30 are exposed to the outside, and therefore, contact with peripheral components may easily occur. When the contact occurs, the terminals 62a and 62b of the connector 60 may be easily damaged.

BRIEF DESCRIPTION OF THE DRAWINGS

Embodiments will be described in detail with reference to the following drawings in which like reference numerals refer to like elements, and wherein.

DETAILED DESCRIPTION

Description will now be given of the embodiments, with reference to the accompanying drawings. For the sake of brief description with reference to the drawings, the same or equivalent components will be provided with the same reference numbers, and repetitive description thereof has been omitted.

Figure 1:
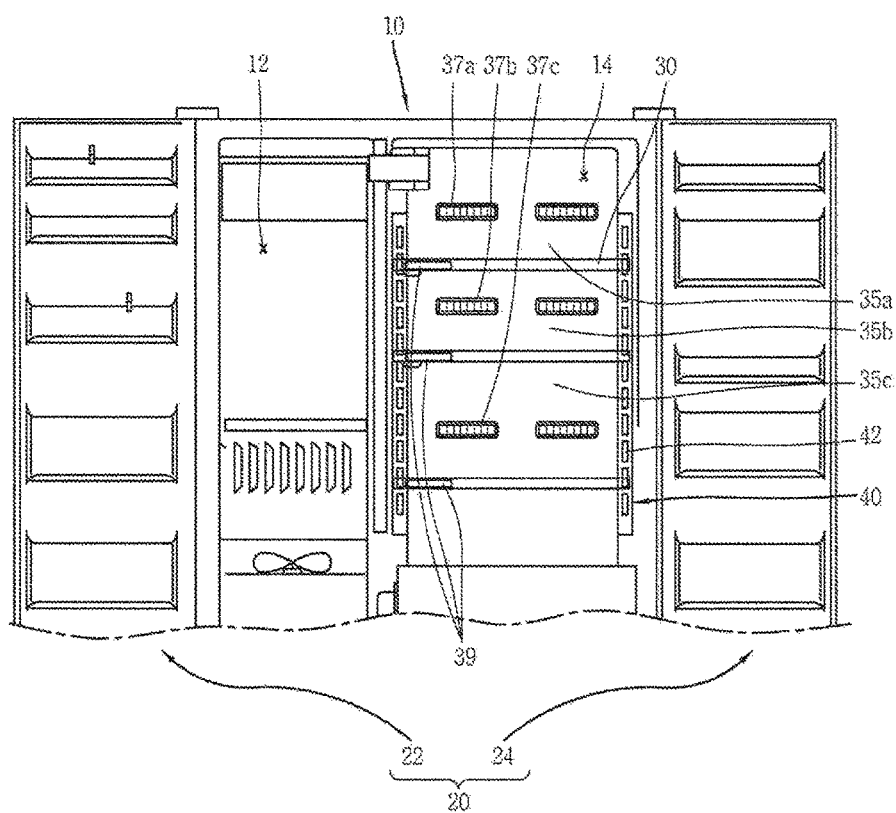
FIG. 1 is a view showing an interior of a related art refrigerator.
Figure 2:
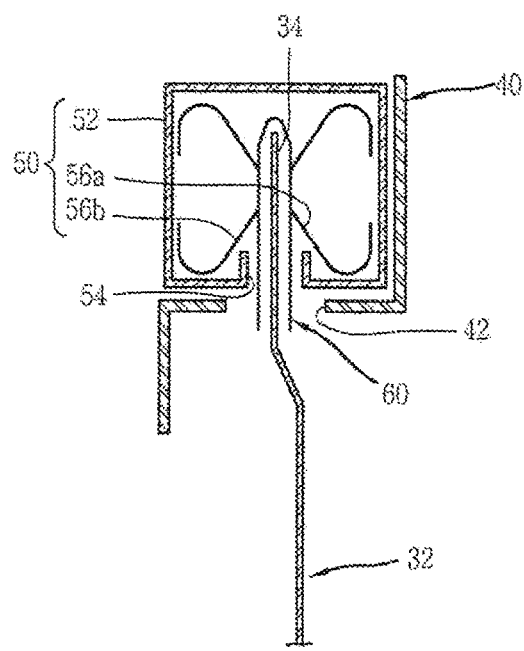
FIG. 2 is an enlarged sectional view of a connection area between a shelf and a power bus of the relative art refrigerator of FIG. 1.
Figure 3:
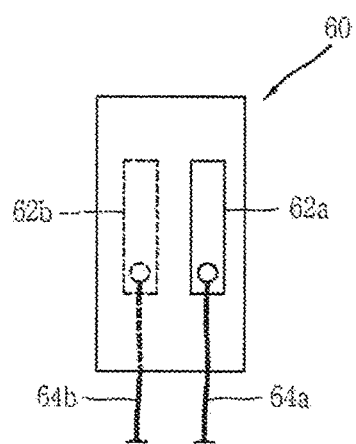
FIG. 3 is an enlarged view of a connector of FIG. 2.
Figure 4:
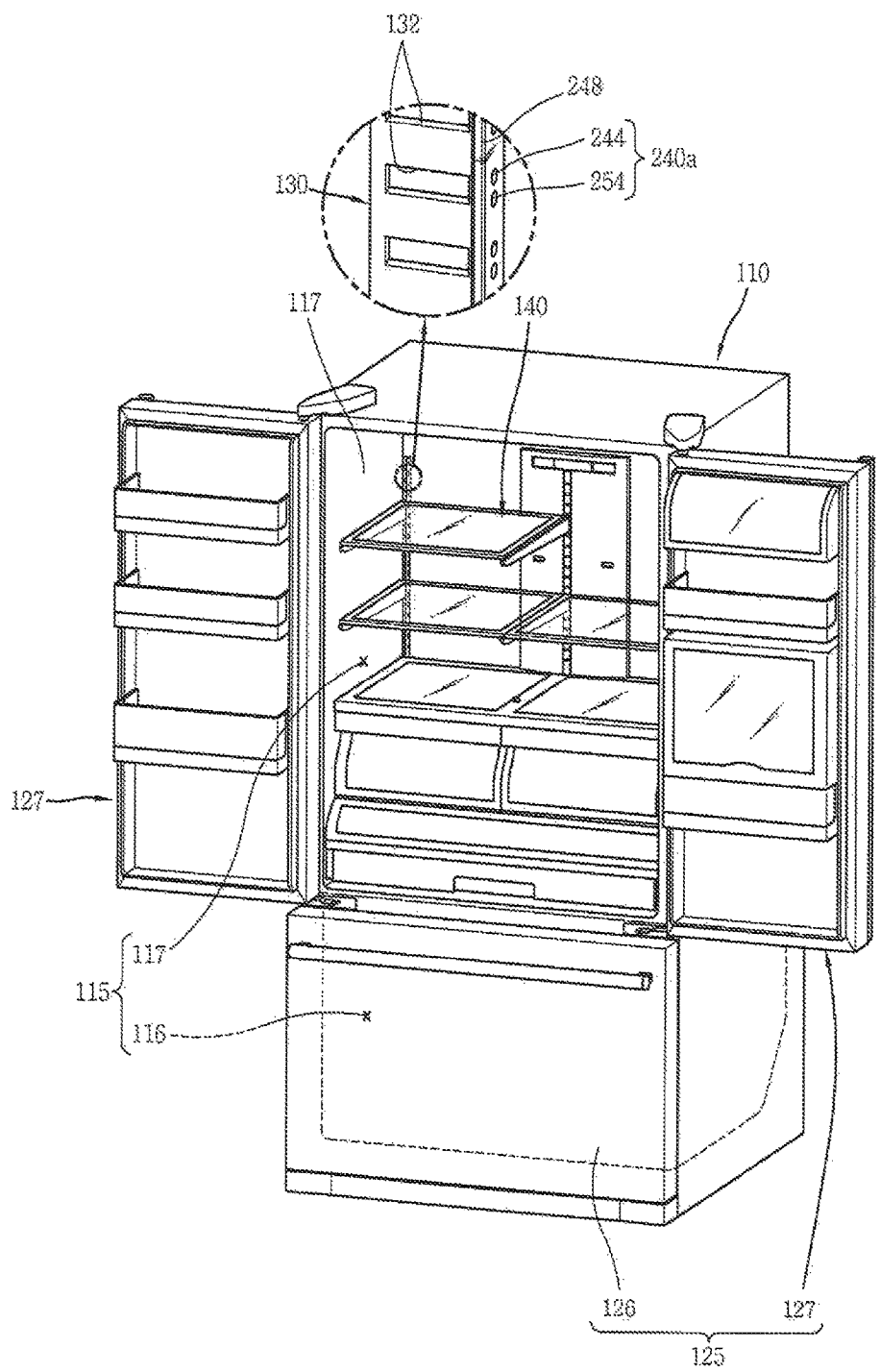
FIG. 4 is a perspective view of a refrigerator with shelf light according to an embodiment.
Figure 5:
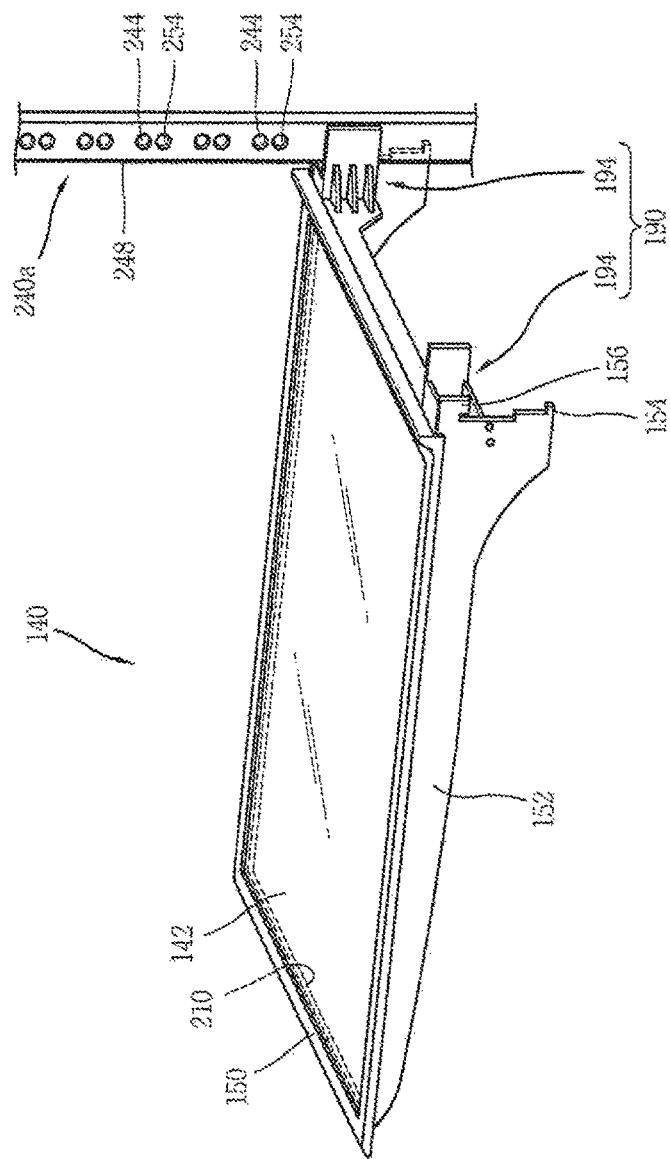
FIG. 5 is a view illustrating a coupling between a shelf and a shelf support of FIG. 4.
Figure 6:
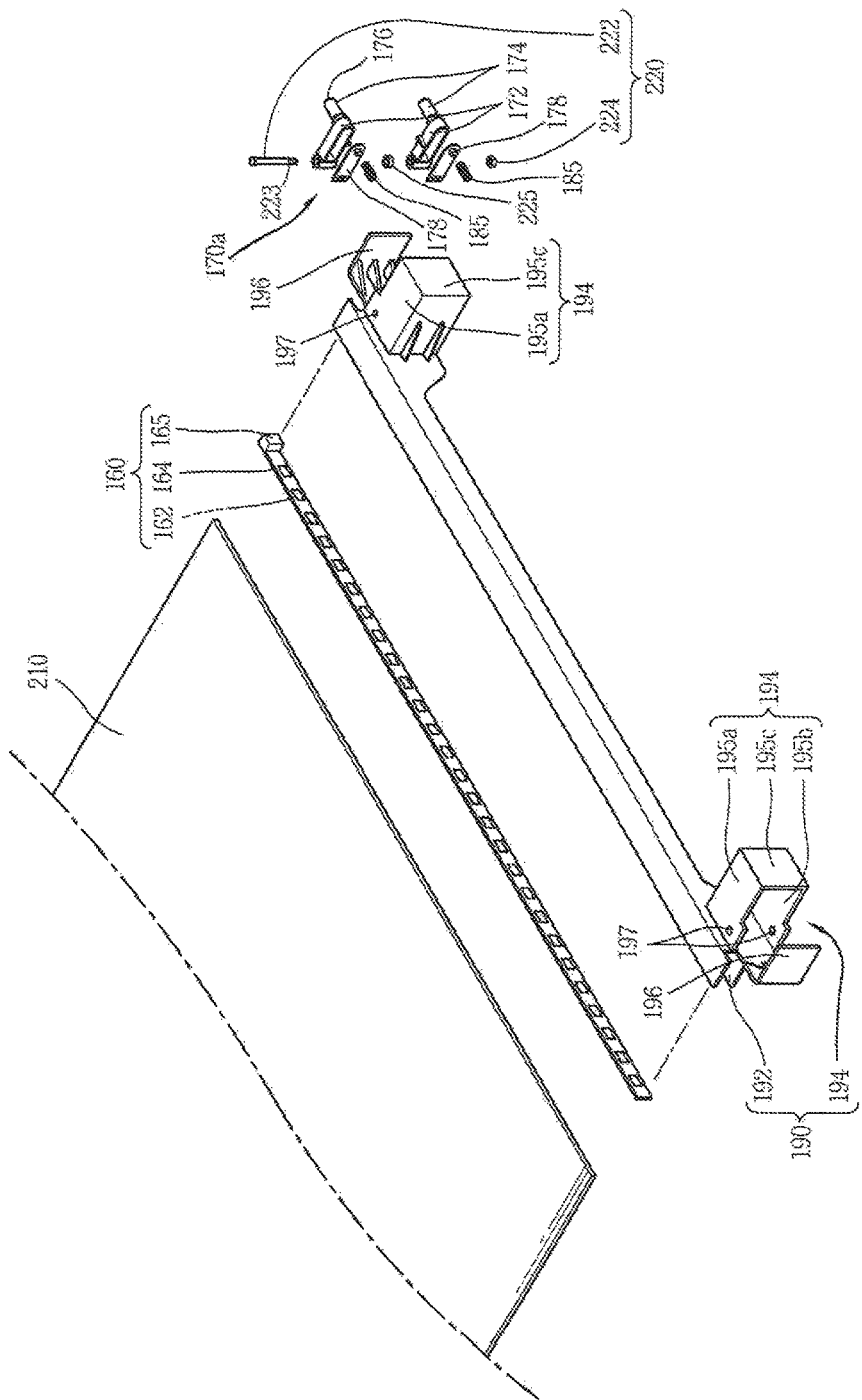
FIG. 6 is expanded view of the coupling of FIG. 5.
Figure 7:
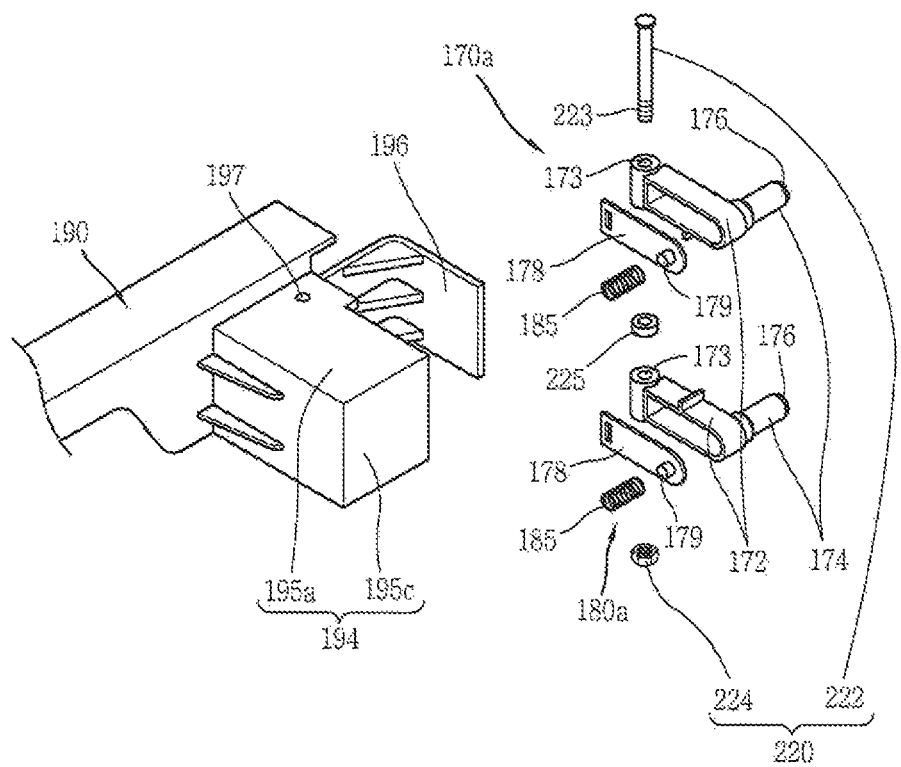
FIG. 7 is an enlarged view of a main portion of FIG. 6.
Figure 8:
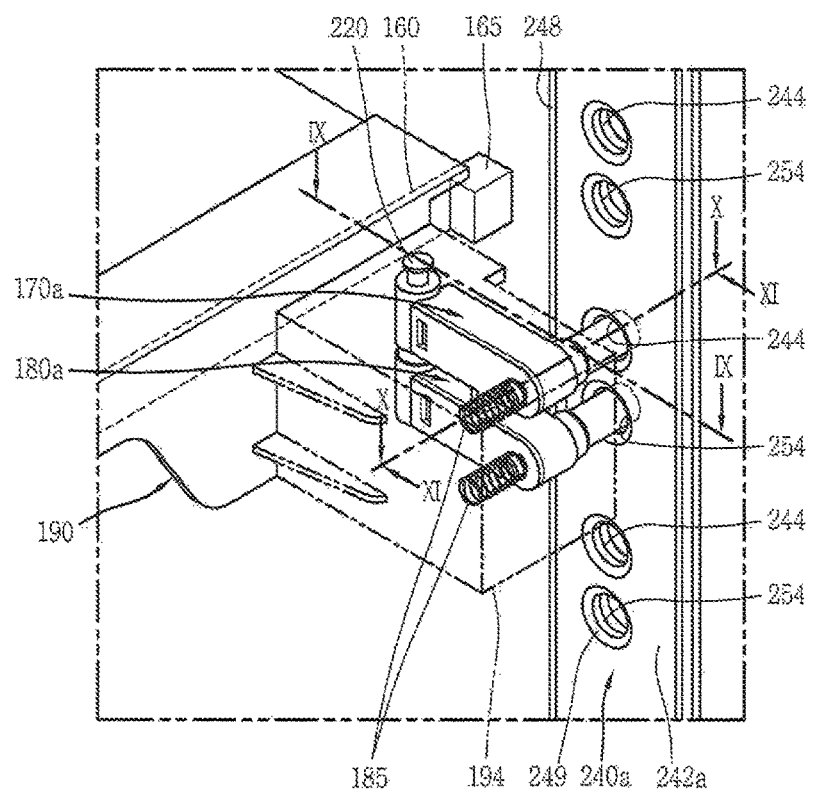
FIG. 8 is a perspective view showing a coupling state between a terminal and a socket of FIG. 5.
Figure 9:
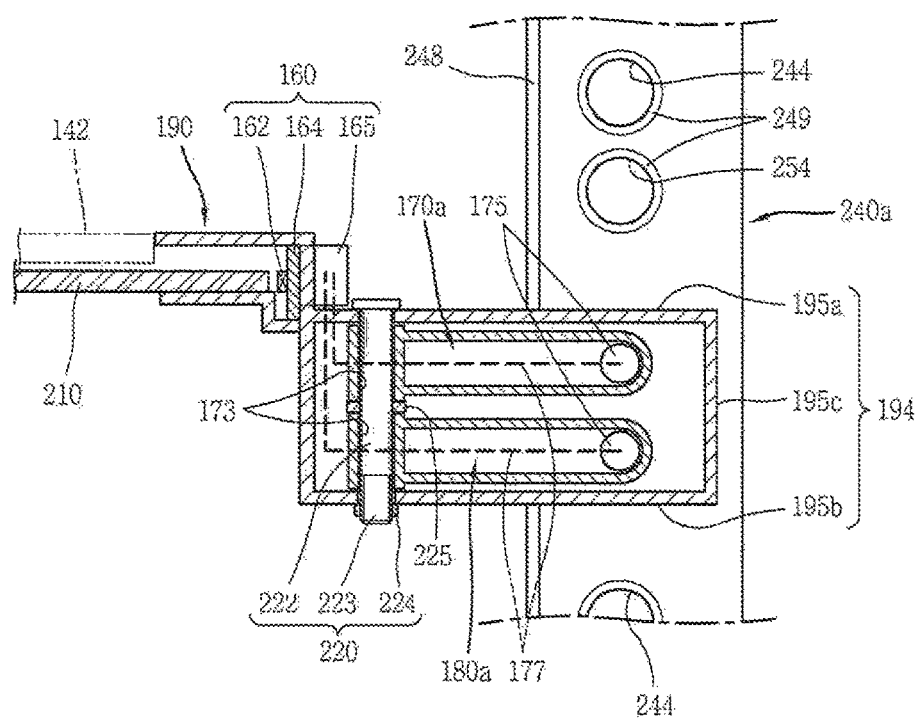
FIG. 9 is a cross-sectional view taken along line IX-IX of FIG. 8.
Figure 10:
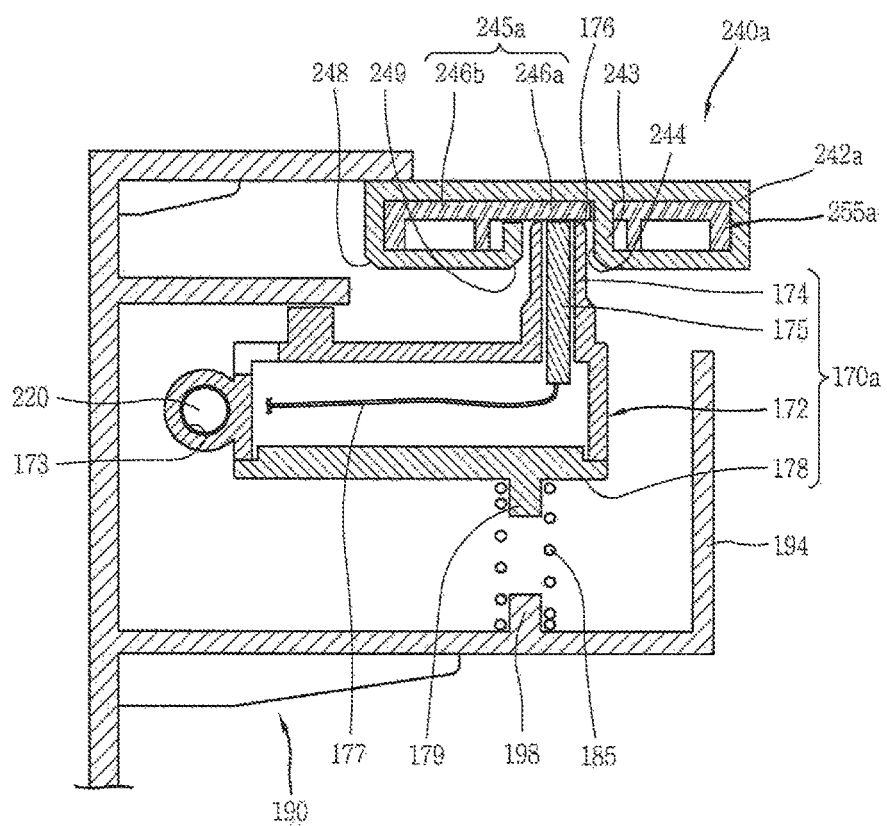
FIG. 10 is a cross-sectional view taken along line X-X of FIG. 8.
Figure 11:
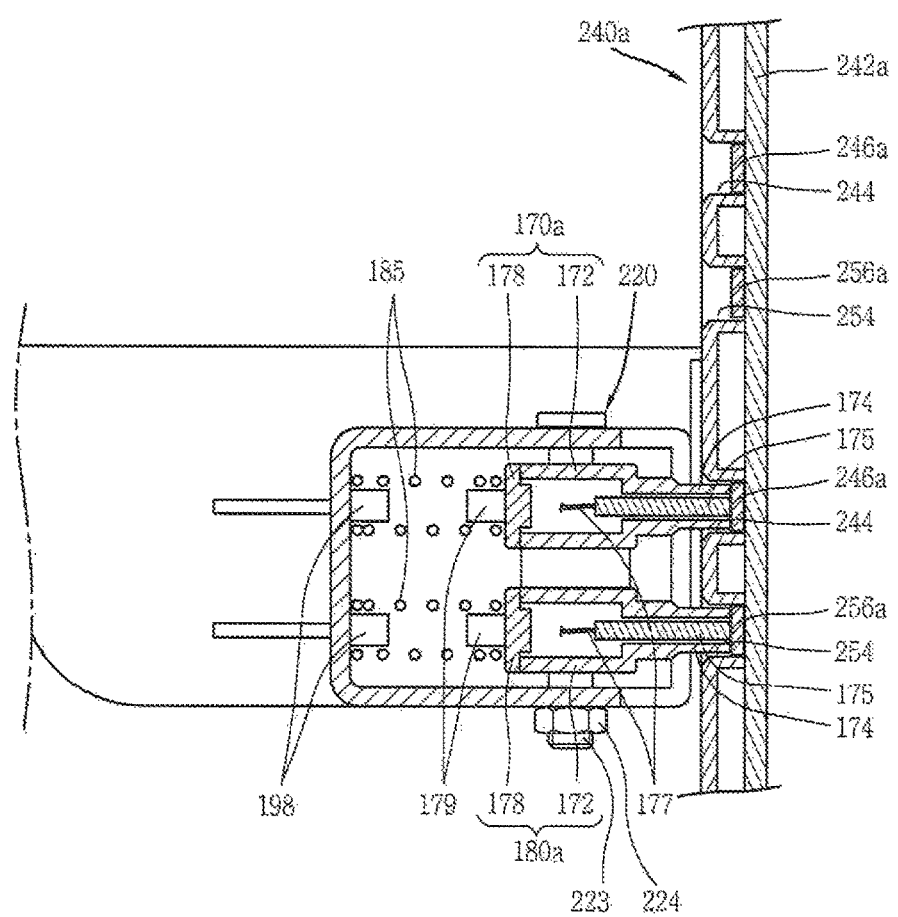
FIG. 11 is a cross-sectional view taken along line XI-XI of FIG. 8.
Figure 12:
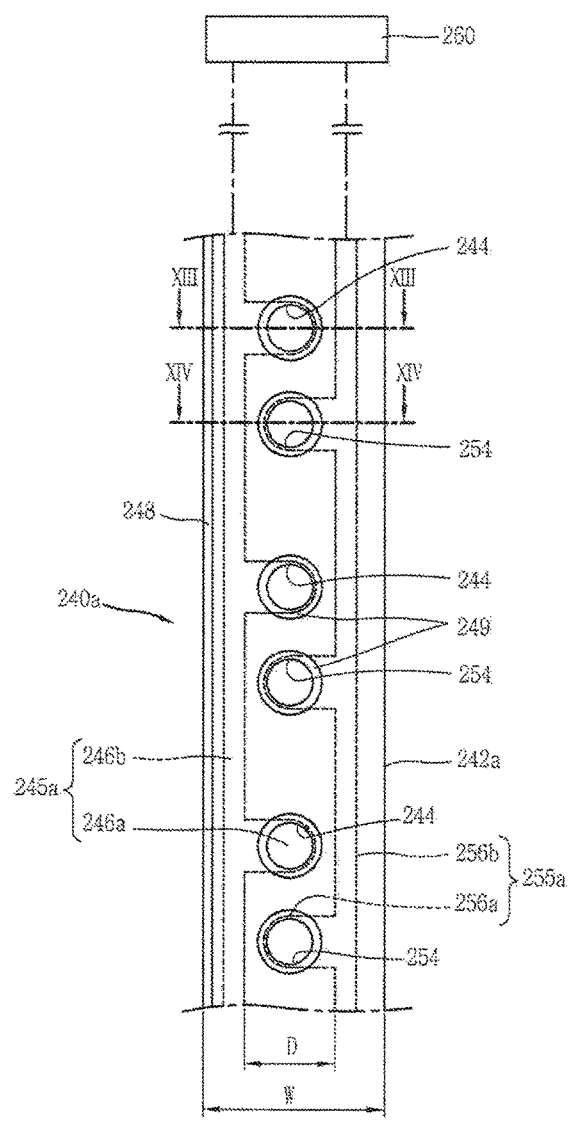
FIG. 12 is a front view of the socket of FIG. 5.
Figure 13:
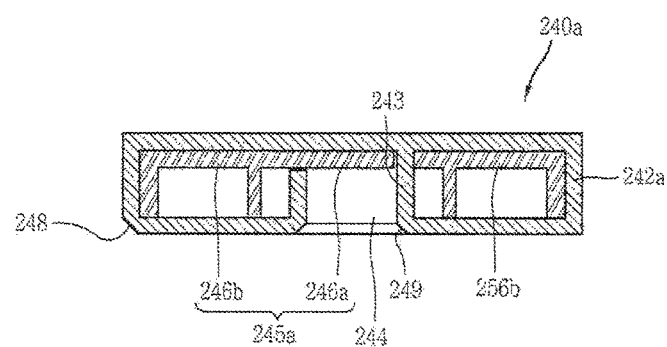
FIG. 13 is a cross-sectional view taken along line XIII-XIII of FIG. 12.
Figure 14:
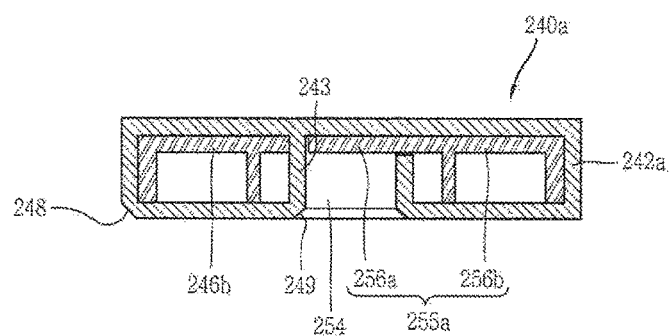
FIG. 14 is a cross-sectional view taken along line XIV-XIV of FIG. 12.

FIG. 4 is a perspective view of a refrigerator with shelf lighting according to an embodiment. FIG. 5 is a view illustrating a coupling between a shelf and a shelf support of FIG. 4. FIG. 6 is expanded view of the coupling of FIG. 5. FIG. 7 is an enlarged view of a main portion of FIG. 6. FIG. 8 is a perspective view showing a coupling state between a terminal and a socket of FIG. 5. FIG. 9 is a cross-sectional view taken along line IX-IX of FIG. 8. FIG. 10 is a cross-sectional view taken along line X-X of FIG. 8. FIG. 11 is a cross-sectional view taken along line XI-XI of FIG. 8. FIG. 12 is a front view of the socket of FIG. 5. FIG. 13 is a cross-sectional view taken along line XIII-XIII of FIG. 12. FIG. 14 is a cross-sectional view taken along line XIV-XIV of FIG. 12.

As shown in FIG. 4, a refrigerator with shelf lighting according to an embodiment may include a refrigerator main body 110 having a storage room 115; at least one shelf 140 provided inside of the storage room 115; a light source 160 provided at a rear end of each shelf 140; a power supply 240a provided at a rear of the storage room 115, the power supply 240a supplying power to each light source 160; and a light guide plate 210 provided for each shelf 140. The light guide plate 210 may guide light of the light source in a forward direction. The storage room 115, for example, may include a freezing room 116 and a refrigerating room 117.

A door 125 that opens/closes the storage room 115 may be provided on the refrigerator main body 110. The door 125, for example, may include a freezing room door 126 and a refrigerating room door 127 that, respectively, open and close the freezing room 116 and the refrigerating room 117.

The at least one shelf 140 may include a plurality of shelves 140, for example, that extends horizontally to divide an internal space of the storage room 115. At least one shelf support 130, for example, that horizontally supports each shelf 140 may be provided inside of the storage room 115. The shelf support 130, for example, may be configured to support the respective shelf 140 at a predetermined height.

The at least one shelf support 130, for example, may include a plurality of insertion projection coupling portions 132 vertically spaced apart from each other at a predetermined distance such that a height of the respective shelf 140 may be adjusted. Each insertion projection coupling portion 132, for example, may be configured as a through-hole.

A plurality of the shelves 140 may be provided at a same height in a lateral direction. In FIG. 4, it is illustrated that two shelves 140 are provided at left and right sides at the same height. However, it will be apparent that a single shelf having a length corresponding to a lateral width of the storage room 115 may be provided, for example.

Each shelf 140, for example, may include a panel 142, a frame 150 that supports the panel 142, and the light source 160 provided at one side of the frame 150. The light source 160, for example, may be provided close to the power supply 240a. Accordingly, a distance between the power supply 240a and the light source 160 may be reduced, so that it is possible to reduce a length of an electric wire that connects the power supply 240a and the light source 160 to each other.

More specifically, the power supply 240a, for example, may be provided at the rear of the storage room 115. The power supply 240a may include first and second sockets 244 and 254 separated from each other.

The light source 160 may be provided at a rear end of the shelf 140. The panel 142, for example, may have a rectangular plate shape. Further, the panel 142, for example, may be formed of a transparent rigid member. For example, the panel 142 may be formed of a glass member.

The frame 150, for example, may have a quadrangular frame shape, to support four sides of the panel 142. The frame 150, for example, may be configured as a cantilever, a rear end of which is coupled to the shelf support 130.

A least one insertion projection 154 to be inserted into a respective insertion projection coupling portion 132 of the shelf support 130, for example, may be provided on the frame 150 (cantilever 152). The insertion projection 154 may be formed at rear ends of both sides (cantilevers 152) of the frame 150.

A plurality of the insertion projection 154, for example, may be formed spaced apart from each other along a vertical direction of the frame 150. Among the plurality of insertion projections 154, the insertion projection 154 provided at an upper side, for example, may have a bent end 156 that bends downward. The bent end 156 may be inserted into the insertion projection coupling portion 132 and then contact a rear of a lower side of the insertion projection coupling portion 132 to be held and maintained, so that the shelf 140 may be stably maintained in a horizontal state.

Each shelf 140 may include the light guide plate 210. The light guide plate 210, for example, may be provided under the panel 142. The light guide plate 210, for example, may have a rectangular plate shape.

Further, the light guide plate 210, for example, may have a size corresponding to a shape of the panel 142. Furthermore, the light guide plate 210, for example, may be supported by the frame 150.

The light source 160, for example, may include a plurality of light emitting diodes (LEDs) 162. More specifically, the light source 160 may be configured as an LED module including a plurality of LEDs 162 and a support 164 that supports the plurality of LEDs 162. In this embodiment, it is illustrated that the support 164 is formed in a linear shape, such that the plurality of LEDs 162 are arranged in a line.

The light source 160, for example, may extend lengthwise at the rear end of the shelf 140. A power input (LED terminal) 165, through which power may be input, may be provided at one end of the light source 160.

The light guide plate 210 may be provided such that one end (a rear end on the drawing) thereof faces or contacts the light source 160. The plurality of LEDs 162 may be provided along the rear end of the light guide plate 210.

The light guide plate 210 may guide light emitted from the light source 160 to be uniformly irradiated onto a lower side of the shelf 140. Accordingly, it is possible to prevent a front lower area of the shelf 40, which may be provided at a relative distance from the light source 160 from getting dark. Further, indirect lighting may be provided for a lower area of each shelf 140, and thus, it may be possible to prevent the occurrence of glare caused by direct lighting of the light source 160. Furthermore, a lower space of the shelf 140 may be uniformly lighted by the light guide plate 210 having the rectangular shape corresponding to the size of the panel 142.

The shelf 140, for example, may have a first terminal 170*a* connected to the light source 160. The first terminal 170*a* may protrude at the rear of the frame 150 and bending sideways to be connectable to the first socket 244. The shelf 140, for example, may also have a second terminal 180*a* connected to the light source 160 at one side of the first terminal 170*a*. The second terminal 180*a* may protrude at the rear of the frame 150 and bending sideways to be connectable to the second socket 254.

A light source support 190 that supports the light source 160 may be provided at a rear end of the frame 150. As shown in FIG. 5, the light source support 190, for example, may be provided between rear end portions of both of the cantilevers 152 of the frame 150.

As shown in FIG. 6, the light source support 190, for example, may include a light source accommodating portion 192 that accommodates the light source 160 at one side thereof to be coupled to the light source support 190, and a terminal coupling portion 194, at which the first terminal 170*a* and the second terminal 180*a* may be coupled to the light source support 190. The light source support 190, for example, may include coupling portions 196 provided at both sides thereof. Each coupling portion 196 may contact and be coupled to an inner surface of the cantilever 152. The light source accommodating portion 190, for example, may be formed to be opened toward a front of the storage room 115. The terminal coupling portions 194, for example, may be formed at both end area of the light source support 190, respectively.

With this embodiment, positions of the first terminal 170*a* and the second terminal 180*a* may be appropriately selected as any one of a left or first side or a right or second side of the shelf 140 by considering an internal environment (condition) of the storage room 115, so that it is possible to facilitate installation of the first and second terminals 170*a* and 180*a*.

The power supply 240*a* having the first and second sockets 224 and 254, to which the first and second terminals 170*a* and 180*a* may be connected, respectively, may be provided at one side of the shelf support 130 along a lateral direction of the storage room 115. The power supply 240*a*, for example, may be provided at one side of the shelf support 130 along the lateral direction of the storage room 115. In this embodiment, it is illustrated that the power supply 240*a* is provided at one side (a right side in the drawing) of the shelf support 130 provided at the left side among the shelf supports 130. However, the power supply 240*a* may be provided at another side (that is, a left side) of the shelf support 130 provided at the right side among the shelf supports 130.

Also, in this embodiment, it is illustrated that the terminal coupling portion 194 is formed at both ends of the light source support 190. However, it will be apparent that a position of the light source support 190 may be appropriately adjusted.

The first terminal 170*a* and the second terminal 180*a* may be individually coupled to the terminal coupling portion 194. The first terminal 170*a* and the second terminal 180*a* may be simultaneously coupled to a same terminal coupling portion 194.

With this embodiment, a number of supporting points that support the first and second terminals 170*a* and 180*a* may be reduced, so that it is possible to achieve a simple and compact configuration.

The terminal coupling portion 194, for example, may have an accommodating space having one open side. More specifically, the terminal coupling portion 194, for example, may include a top surface 195*a*, a bottom surface 195*b*, and a side surface 195*c* that connects the top surface 195*a* and the bottom surface 195*b* to each other such that one side of the terminal coupling portion 194 is open.

The first terminal 170*a* and the second terminal 180*a*, for example, may be configured to be relatively rotatable with respect to the power supply 240*a*. Further, the first terminal 170*a* and the second terminal 180*a*, for example, may have a same shape and size. Also, the first terminal 170*a* and the second terminal 180*a*, for example, may be spaced apart from each other along a vertical direction.

In this embodiment, it is illustrated that the first terminal 170*a* and the second terminal 180*a* have the same shape and size and are provided spaced apart from each other in the vertical direction. However, alternatively, the first terminal 170*a* and the second terminal 180*a* may be spaced apart from each other in a lateral (horizontal) direction.

Additionally, the first terminal 170*a* and the second terminal 180*a*, for example, may have a same length from a rotational axis line. Correspondingly, the first socket 244 and the second socket 254 may have a same shape and size.

A fastening member 220, for example, that rotatably fastens the first terminal 170*a* and the second terminal 180*a* to each other may be provided on the terminal coupling portion 194. The fastening member 220, for example, may include a rod 222 coupled to the terminal coupling portion 194 by vertically passing through the terminal coupling portion 194 (and the first terminal 170*a* and the second terminal 170*b*, see FIG. 9), and a nut 224 screw-coupled to the rod 222. The rod 222, for example, may include a head formed at a first side thereof and a male screw 223 formed at a second side thereof. Rod insertion holes 197 may be formed in the top surface 195*a* and the bottom surface 195*b* of the terminal coupling portion 194 to pass through the top surface 195*a* and the bottom surface 195*b*, respectively, so that the rod 222 may be inserted into the terminal coupling portion 194.

The first terminal 170*a* and the second terminal 180*a*, for example, as shown in FIG. 7, may each include body 172 having an insertion end 174 configured to be inserted into the first socket 244 and the second socket 254, respectively, and a conductor 175 provided at or in the insertion end 174, respectively. Each insertion end 174, for example, may be bent almost perpendicularly with respect to each body 172.

A guide 176, for example, that guides each insertion end 174 into the first socket 244 or the second socket 254 may be formed at the insertion end portion 174. The guide 176 may be formed such that an outer width thereof gradually decreases along a protruding direction of the insertion end 174.

In this embodiment, it is illustrated that the guide 176 is formed to have a curved section. However, the guide 176 may be formed to have a linear section.

The conductor 175 may be provided at a center of each insertion end 174. The conductor 175 of each of the first terminal 170a and the second terminal 180a, for example, as shown in FIG. 9, may be electrically connected to the power input 165 of the light source 160 by an electric conduction wire 177.

The electric conduction wire 177, for example, may be provided inside of the terminal coupling portion 194. Accordingly, it is possible to prevent the electric conduction wire 177 from being exposed to the outside.

Fastening member accommodating portions 173, in which the fastening member (rod 222) 220 may be relatively rotatably accommodated, may be formed at one side of the bodies 172 of the first terminal 170a and the second terminal 180a, respectively. A washer 225, for example, may be provided between the bodies 172 of the first terminal 170a and the second terminal 180a. Accordingly, the first terminal 170a and the second terminal 180a may be smoothly relatively rotatable while maintaining a predetermined distance therebetween.

Openings may be formed at one side of the bodies 172 of the first terminal 170a and the second terminal 180a, respectively. Covers 178 that cover the openings may be provided for the openings of the bodies 172 of the first terminal 170a and the second terminal 180a, respectively.

Terminal springs 185 that apply an elastic force to the first terminal 170a and the second terminal 180a to be connected to the first socket 244 and the second socket 254 may be provided at one side of the first terminal 170a and the second terminal 180a, respectively. The terminal springs 185, for example, may include a first terminal spring 185 provided at a rear of the first terminal 170a and a second terminal spring 185 provided at a rear of the second terminal 180a. More specifically, a first end of each terminal spring 185 may contact with the rear of each terminal, and a second end of each terminal spring 185 may contact with an inner wall of the terminal coupling portion 194.

According to this embodiment, in the first terminal 170a and the second terminal 180a, each insertion end 174 may protrude to the outside, that is, to a protruding position of the terminal coupling portion 194 by the elastic force of each terminal spring 185, and may temporarily move back (rotate backward) to a withdrawn position as each terminal spring 185 is compressed when the insertion end 174 contacts the power supply 240a, thereby reducing impact.

In this embodiment, it is illustrated that the terminal spring includes a plurality of terminal springs. However, one or a plurality of the terminal spring may be provided.

A terminal spring support 179 may be formed on the cover 178 of each terminal, to support the first end of each terminal spring 185. The terminal spring support 179, for example, may be formed on a surface of the cover 178 of each terminal. The terminal spring support 179, for example, may be in the form of a projection that protrudes from the surface of each cover 178 and be inserted into an end of each terminal spring 185 when the terminal spring support 179 is coupled to the terminal spring 185.

In this embodiment, it is illustrated that the terminal spring support 179 is in the form of the projection that protrudes from the surface of the cover 178. However, the terminal spring support 179 may be formed in the surface 178 such that the end of the terminal spring 185 may be inserted to a predetermined depth.

The second end of each terminal spring 185, for example, as shown in FIGS. 10 and 11, may be supported by a terminal spring support 198 formed on an inner surface of the terminal coupling portion 194. The terminal spring support 198, for example, may be formed to protrude from the inner surface of the terminal coupling portion 194.

The power supply 240a, for example, as shown in FIG. 11, may include the first socket 244 and the second socket 254 vertically provided such that the insertion ends 174 of the first terminal 170a and the second terminal 180a may be inserted into the first socket 244 and the second socket 254, respectively. The power supply 240a, for example, may be configured such that the first socket 244 and the second socket 254 are open in the sideways direction (lateral direction) of the storage room 115.

According to this embodiment, it is possible to prevent a foreign substance from entering into the first socket 244 and the second socket 254 when food or other items are put into and/or taken out of the storage room 115 along a front to rear direction. Also, open areas of the first socket 244 and the second socket 254 may be visually blocked from a front area of the storage room 115.

The power supply 240a, for example, as shown in FIGS. 12 and 13, may include a housing 242a, in which the first socket 244 and the second socket 254 may be formed, and conductors 245a and 255a provided inside of the housing 242a. The housing 242a may be formed of an electrical insulation member. The housing 242a, for example, may have a guide surface 248 that guides the first terminal 170a and the second terminal 180a to be turned when the first terminal 170a and the second terminal 180a are coupled to the power supply 240a.

According to this embodiment, when the shelf 140 is inserted and coupled to the power supply 240a, the first terminal 170a and the second terminal 180a may be easily guided by the guide surface 248 when the first terminal 170a and the second terminal 180a contact the housing 242a. Thus, an impact between the first and second terminals 170a and 180a and the housing 242a may be reduced, thereby preventing component damage caused by an impact. The housing 242a may be configured such that the first socket 244 and the second socket 254 are formed on a same plane.

According to this embodiment, a number of housings may be reduced, and thus, it is possible to facilitate manufacturing and installation of the power supply 240a. For example, the first conductor 245a provided at the rear of the first socket 244 and the second conductor 255a provided at a rear of the second socket 254 may be provided inside of the housing 242a.

Further, the housing 242a, for example, may be configured such that the first socket 244 and the second socket 254 are vertically provided in a line. Accordingly, a distance D between the first conductor 245a and the second conductor 255a may be narrowed, thereby reducing a width W of the housing 242a.

The first conductor 245a, for example, may include a first contact piece 246a provided at the rear of the first socket 244, and a connecting portion 246b connected to the first contact piece 246a. The second conductor 255a, for example, may include a second contact piece 256a provided at the rear of the second socket 254, and a connecting portion 256b connected to the second contact piece 256a. The contact pieces 246a and 256a may contact the conductors 175 of the insertion ends 174 of the terminals 170a and 180a, respectively.

One end of each of the connecting portions 246b and 256b may be connected to a power connection portion 260, such that power may be supplied to the connecting portions 246b and 256b. Accordingly, when the first terminal 170a and the second terminal 180a are inserted into the first socket 244 and the second socket 254, respectively, the contact pieces 246a and 256a and the conductors 175 may be electrically connected to each other, so that the light source 160 may be in a current conduction state.

The light source 160 may emit light when a current is applied in a state in which the first terminal 170a and the second terminal 180a are, respectively, connected to the first socket 244 and the second socket 254, thereby radiating the light around the light source 160.

The first conductor 245a and the second conductor 255a may be electrically insulated from each other. The housing 242a, for example, may include a partitioning wall or partition 243 that partitions an internal space of the housing 242a such that the first socket 244 and the second socket 254 may be electrically separated from each other.

A guide 249, for example, that guides the first terminal 170a into the first socket 244 may be formed at an entrance of the first socket 244, and a guide 249, for example, that guides the second terminal 180a into the second socket 254 may be formed at an entrance of the second socket 254. Each guide 249, for example, may be formed such that an inner width thereof gradually decreases toward an inside thereof.

According to this embodiment, when the height of the shelf 140 is adjusted, the insertion projection 154 of the shelf 140 may be inserted and coupled into the insertion projection coupling portion 132 of the shelf support 130 by moving the shelf 140 to a desired height. In a process of inserting the insertion projection 154 of the shelf 140 into the insertion projection coupling portion 132, the first terminal 170a and the second terminal 180a may contact the housing 242a of the power supply 240a. The insertion ends 174 of the first terminal 170a and the second terminal 180a may be pushed by the guide surface 248 of the housing 242a to be rotated to the withdrawn positions about the fastening member 220. In this case, each terminal spring 185 may accumulate an elastic force while being compressed. If the insertion of the insertion projection 154 of the shelf 140 is completed, the first terminal 170a and the second terminal 180a may be pushed by the elastic forces of the terminal springs 185 to be rotated to the protruding positions, respectively.

The guides 176 of the insertion ends 174 of the first terminal 170a and the second terminal 180a and/or the guides 249 of the first socket 244 and the second socket 254 may guide the insertion ends 174 of the first terminal 170a and the second terminal 180a into the corresponding sockets, respectively, so that the insertion of insertion ends 174 of the first terminal 170a and the second terminal 180a may be smoothly performed. The conductors 175 of the first terminal 170a and the second terminal 180a may be pushed by the elastic forces of the terminal springs 185 to contact the conductors 245a and 255a of the corresponding sockets with a predetermined contact pressure, respectively, thereby maintaining a stable contact (current conduction) state. The light source 160, for example, may emit light as a current is applied thereto when the door 125 is opened.

Hereinafter, a modification of the terminals and the sockets will be described with reference to FIGS. 15 to 19.

Figure 15:
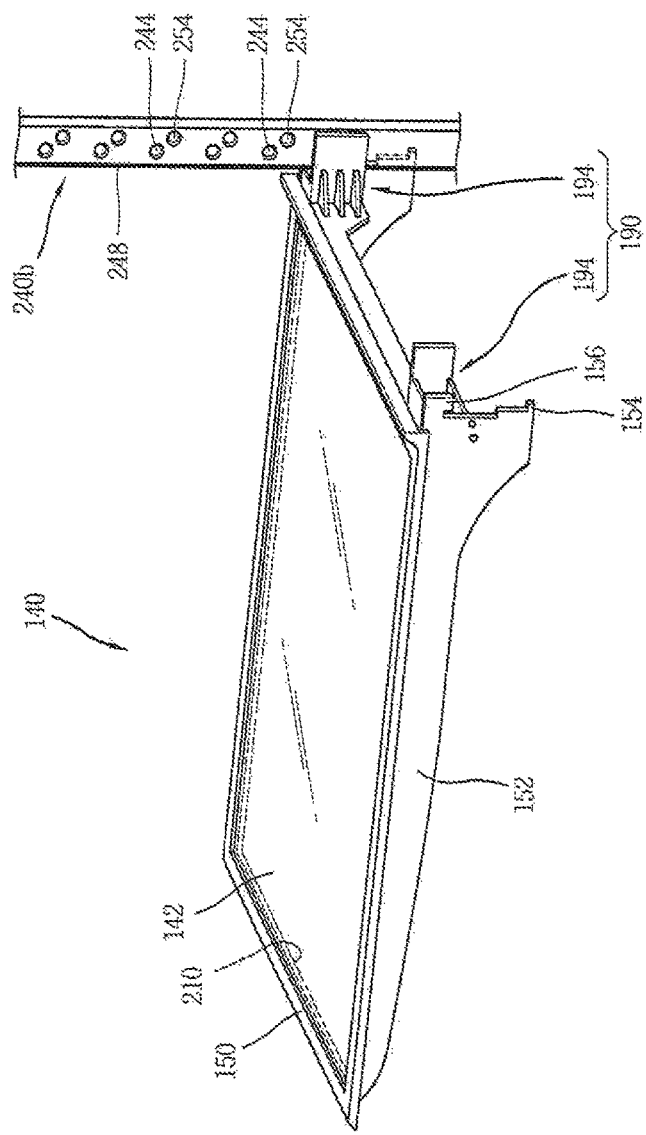
FIG. 15 is a view illustrating a coupling between a shelf and a shelf support according to another embodiment.
Figure 16:
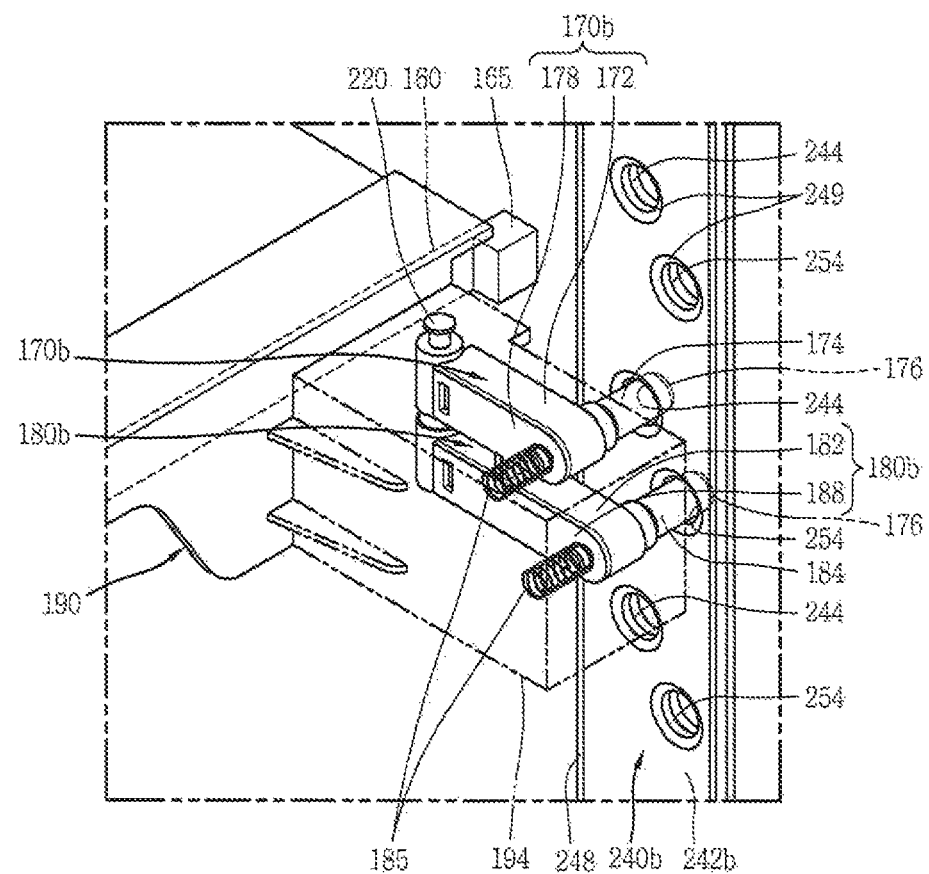
FIG. 16 is a front view of a socket of FIG. 15.
Figure 17:
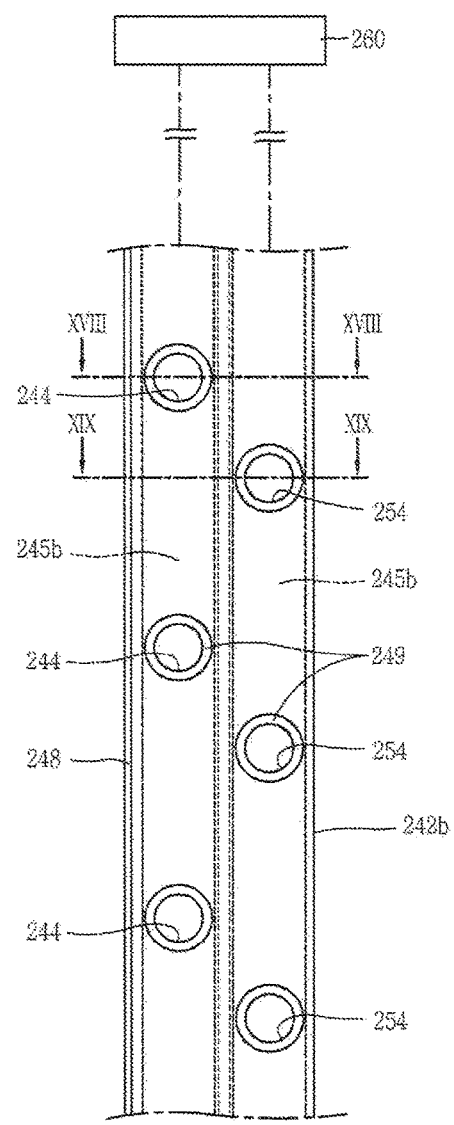
FIG. 17 is an enlarged view of a main portion of FIG. 15.
Figure 18:
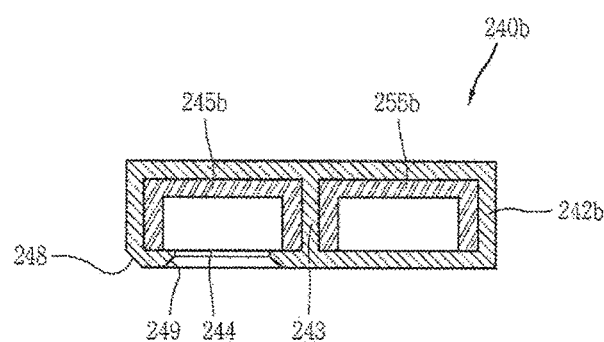
FIG. 18 is a sectional view taken along line XVIII-XVIII of FIG. 16.
Figure 19:
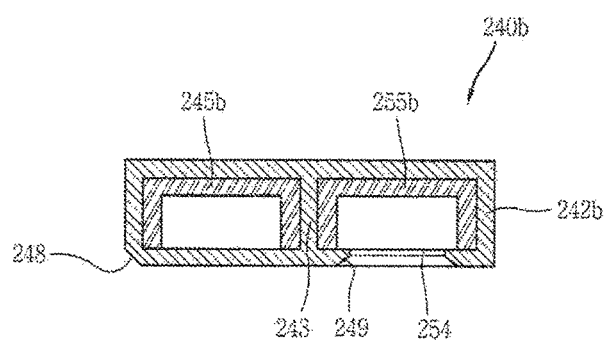
FIG. 19 is a sectional view taken along line XIX-XIX of FIG. 16.

FIG. 15 is a view illustrating a coupling between a shelf and a shelf support according to another embodiment. FIG. 16 is a front view of a socket of FIG. 15. FIG. 17 is an enlarged view of a main portion of FIG. 15. FIG. 18 is a sectional view taken along line XVIII-XVIII of FIG. 16. FIG. 19 is a sectional view taken along line XIX-XIX of FIG. 16.

In FIGS. 15 to 19, illustration of components identical and similar to those described above have been omitted, and components will be described using the same or like reference numerals. In addition, some descriptions overlapping with those described above have been omitted.

As described above, the shelf support 130 may be provided inside of the storage room 115. A plurality of shelves 140 may be supported by the shelf support 130 to be vertically spaced apart from each other.

Each shelf 140, for example, may include panel 142, frame 150 that supports the panel 142, light source 160 provided at one side of the frame 150, a first terminal 170b connected to the light source 160, and a second terminal 180b connected to the light source 160 while being spaced apart from the first terminal 170b.

A power supply 240b that supplies power to the light source 160 may be provided at one side of the shelf support 130. The power supply 240b may include first socket 244 connected to the first terminal 170b, and second socket 254 spaced apart from the first socket 244 at one side of the first socket 244. The second socket 254 may be connected to the second terminal 180b.

The first terminal 170b and the second terminal 180b, for example, may have different sizes. More specifically, as shown in FIG. 16, the second terminal 180b, for example, may have a longer length than the first terminal 170b. The first terminal 170b of this embodiment may have a same shape and size as the first terminal 170a of the previous embodiment.

The first terminal 170b and the second terminal 180b, for example, may be fastened to be vertically rotatable by a same fastening member 220. Guide 176, an outer width of which may be gradually decreased along a protruding direction of the first terminal 170b and the second terminal 180b, may be formed at an insertion end 174,184 of each of the first terminal 170b and the second terminal 180b.

A body 182 and a cover 188 of the second terminal 180b may have longer lengths than body 172 and cover 178 of the first terminal 170b, respectively. The insertion end 184 of the second terminal 180b may be provided at a greater distance from a rotational axis line than the insertion end 174 of the first terminal 170b. Corresponding to this, the power supply 240b, for example, as shown in FIG. 17, may include a housing 242b, in which the first socket 244 and the second socket 254 may be formed to be vertically and laterally spaced apart from each other. The power supply 240b, for example, may be provided such that the first socket 244 and the second socket 245 are open toward a side of the storage room 115.

With this embodiment, the first socket 244 and the second socket 254 may be open toward the side of the storage room 115, so that it is possible to prevent a foreign substance from entering into the sockets 244 and 254 when food is put into and/or taken out of the storage room 115.

Guides 249, for example, that guide the first terminal 170b and the second terminal 180b into the first socket 244 and the second socket 254 may be provided at entrances of the first socket 244 and the second socket 254, respectively. A first conductor 245b, for example, as shown in FIG. 18, provided at the rear of the first socket 244 to be connected to conductor 175 of the first terminal 170b may be provided inside of the housing 242b. A second conductor 255b, for example, as shown in FIG. 19, provided at the rear of the second socket 254 to be connected to conductor 175 of the second terminal 180b may be provided inside of the housing 242b.

The first conductor 245b and the second conductor 255b may be individually connected to power connection portion 260 such that a current may be applied to the first conductor 245b and the second conductor 255b. Partition 243 that partitions an internal space of housing 242b may be provided, such that the first conductor 245b and the second conductor 255b may be insulated from each other.

According to this embodiment, the configuration of the housing 242b of the power supply 240b, the first conductor 245b, and the second conductor 255b may be simplified, so that it is possible to facilitate manufacturing and assembling of the power supply 240b.

As described above, according to embodiments disclosed herein, the power supply and the light source may be provided close to each other, so that it is possible to reduce a length of an electric wire between the power supply and the light source. Also, the light source may be provided at the rear end of the shelf, and the light guide plate that guides light of the light source forward may be provided, so that it is possible to perform uniform lighting on a lower area of the shelf.

Further, indirect lighting may be provided on the lower area of the shelf by the light guide plate, so that it is possible to prevent the occurrence of glare caused by direct lighting of the light source. Furthermore, each terminal may be connected to a corresponding socket, so that it is possible to prevent the occurrence of a short circuit caused by moisture.

Additionally, the terminal may be rotatably supported, so that it is possible to prevent the occurrence of damage to the terminal, caused by an impact to the terminal. The spring that applies an elastic force to the terminal may be provided, so that the terminal and the socket may be smoothly connected to each other. The terminal and the socket may elastically contact each other, so that the connection between the terminal and the socket may be stably maintained. Each socket may be opened along a lateral direction (side direction) of the storage room, so that it is possible to prevent a foreign substance from entering into the socket when food is put into and/or taken out of the storage room.

The terminals may be coupled to a single terminal coupling portion, so that it is possible to reduce a number of supporting points that support the terminals. The sockets may be configured to vertically form a line, so that it is possible to reduce a distance between the conductors (electrodes) and reduce a width (size) of the housing. The guide that guides connection may be provided at an end of the terminal or an entrance of the socket, so that the terminal and the socket may be smoothly connected to each other, thereby preventing a connection failure.

Embodiments disclosed herein provide a refrigerator with shelf lighting, which may reduce a length of an electric wire and perform uniform lighting. Embodiments disclosed herein further provide a refrigerator with shelf lighting, which may prevent the occurrence of a short circuit caused by moisture.

Embodiments disclosed herein also provide a refrigerator with shelf lighting, which may prevent the occurrence of damage caused by an impact to a terminal. Embodiments disclosed herein provide a refrigerator with shelf lighting, which may prevent a foreign substance from entering into a socket when food is put into and/or taken out of a storage room. Embodiments disclosed herein provide a refrigerator with shelf lighting, which may achieve a compact configuration by reducing a number of supporting points of terminals.

Embodiments disclosed herein provide a refrigerator with shelf lighting, which may reduce a distance between power connection conductors (electrodes) and reduce a width (size) of a housing. Embodiments disclosed herein provide a refrigerator with shelf lighting, which may achieve a smooth connection between a terminal and a socket.

Embodiments disclosed herein provide a refrigerator with a shelf capable of lighting that may include a refrigerator main body having a storage room; a shelf provided inside of the storage room; a light source provided at a rear end of the shelf; a power supply provided at a rear of the storage room, the power supply supplying power to the light source, and a light guide plate provided to the shelf. The light guide plate may guide light of the light source to a front of the shelf.

The shelf may have a first terminal protruded to a rear thereof, and a second terminal protruded to the rear while being spaced apart from the first terminal. The power supply may have a first socket to which the first terminal may be connected, and a second socket to which the second terminal may be connected.

The shelf may have an insertion projection protruded to the rear thereof. The storage room may be provided with a shelf supporting portion or support having insertion projection coupling portions into which the insertion projections may be inserted. The insertion projection coupling portions may be vertically spaced apart from each other at a predetermined distance. The first socket and the second socket may be disposed or provided to be spaced apart from each other at a distance corresponding to a distance between the insertion projection coupling portions.

The first terminal and the second terminal may be protruded to the rear of the shelf and bent to a side of the shelf. The first socket and the second socket of the power supply may be formed to be opened along a lateral direction of the shelf.

The shelf may include a frame, and a panel supported by the frame. The first terminal and the second terminal may be supported to the frame to be rotatable between protrusion positions, at which the first terminal and the second terminal may be respectively protruded toward the first socket and the second socket, and withdrawn positions at which the first terminal and the second terminal may be respectively spaced apart from the first socket and the second socket. The shelf may further include terminal springs that respectively apply elastic forces to the first terminal and the second terminal to be rotated to the protrusion positions.

A light source supporting portion or support that supports the light source may be formed at a rear of the frame. The light source supporting portion may have a light source accommodating portion in which the light source may be accommodated, and at least one terminal coupling portion to which the first terminal and the second terminal may be coupled.

The light source may be linearly disposed or provided along a rear end portion or end of the light guide plate. The first terminal and the second terminal may be coupled to a same terminal coupling portion.

The first terminal and the second terminal may be disposed or provided to be spaced apart from each other along a vertical direction. The terminal coupling portion may be provided with a fastening member that simultaneously fastens the first terminal and the second terminal. Each terminal or each socket may be provided with a guiding portion or guide that guides insertion of the terminal or socket.

Embodiments disclosed herein provide a refrigerator with a shelf capable of lighting that may include a refrigerator main body having a storage room; a power supply having first and second sockets provided at a rear of the storage room, the first and second sockets being opened toward a side of the storage room; and a shelf provided inside of the storage room, the shelf including a panel, a frame that supports the panel, and a light source provided at a rear end of the frame. The shelf may include a first terminal connected to the light source, the first terminal protruded to a rear of the frame and bent to a side of the frame to be connectable to the first socket; a second terminal protruded to the rear of the frame and bent to the side of the frame at one side of the first terminal to be connectable to the second socket; a terminal coupling portion to which the first terminal and the second terminal may be rotatably coupled; and terminal springs that respectively apply elastic forces to the first terminal and the second terminal to be connected to the first socket and the second socket. The power supply may have a housing in which the first socket and the second socket may be formed on a same plane.

The first terminal and the second terminal may be disposed or provided to be vertically spaced apart from each other. The terminal coupling portion may have a fastening member that fastens the first terminal and the second terminal to be simultaneously rotatable.

The first terminal and the second terminal may have a same length. The first socket and the second socket may be disposed or provided to vertically form a line.

The power supply may include a first conductor having a first contact piece disposed or provided at a rear of the first socket and a connecting portion connected to the first contact piece; and a second conductor having a second contact piece disposed or provided at a rear of the second socket and a connecting portion connected to the second contact piece. The housing may have a partitioning portion or partition that partitions an internal space of the housing such that the first conductor and the second conductor may be insulated from each other.

The first terminal and the second terminal may have different lengths. The first socket and the second socket may be disposed or provided to be vertically and laterally spaced apart from each other.

The power supply may include a housing in which the first socket and the second socket may be formed; a first conductor disposed or provided at a rear of the first socket; and a second conductor disposed or provided at a rear of the second socket. The housing may have a partitioning portion or partition that partitions an internal space of the housing such that the first conductor and the second conductor may be electrically insulated from each other. Each terminal or each socket may be provided with a guiding portion or guide that guides insertion of the terminal or socket.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A refrigerator with shelf lighting, the refrigerator comprising:
   a refrigerator main body having a storage room;
   at least one shelf support provided at a rear of the storage room and having a plurality of insertion projection coupling portions vertically spaced apart from each other;
   a power supply having first and second sockets provided at one side of the at least one shelf support, wherein the first and second sockets face a side wall of the storage room and are vertically separated from each other; and
   at least one shelf provided inside of the storage room, each at least one shelf including a panel, a frame that supports the panel, and a light source provided at a rear end of the frame, wherein the at least one shelf includes:
      a plurality of insertion projections that protrudes at a rear thereof and is configured to be inserted into the corresponding plurality of insertion projection coupling portions;
      a first terminal electrically connected to the light source, wherein the first terminal comprises a body that protrudes at a rear of the frame and an insertion end that protrudes from the body of the first terminal and is configured to be inserted into the first socket;
      a second terminal electrically connected to the light source and disposed below the first terminal, wherein the second terminal comprises a body that protrudes at the rear of the frame and an insertion end that protrudes from the body of the second terminal and is configured to be inserted into the second socket; and
   at least one terminal coupling portion to which the first terminal and the second terminal are rotatably coupled, wherein the at least one terminal coupling portion comprises:
      a fastening member that vertically passes through the first terminal and the second terminal; and
      terminal springs that respectively apply elastic forces to the first terminal and the second terminal to be connected to the first socket and the second socket, and wherein the first terminal and the second terminal are configured to be rotatable independently from each other based on the fastening member.

2. The refrigerator of claim 1, wherein the power supply includes a housing in which the first socket and the second socket are formed on a same plane.

3. The refrigerator of claim 1, wherein the fastening member fastens the first terminal and the second terminal to be simultaneously rotatable.

4. The refrigerator of claim 3, wherein the first terminal and the second terminal have a same length, and wherein the first socket and the second socket are provided to vertically form a line.

5. The refrigerator of claim 4, wherein the power supply includes:
   a first conductor having a first contact piece provided at a rear of the first socket and a connecting portion connected to the first contact piece; and a second conductor having a second contact piece provided at a rear of the second socket and a connecting portion connected to the second contact piece.

6. The refrigerator of claim 5, wherein the power supply includes a housing, and wherein the housing includes a partition that partitions an internal space of the housing such that the first conductor and the second conductor are insulated from each other.

7. The refrigerator of claim 3, wherein the first terminal and the second terminal have different lengths, and wherein the first socket and the second socket are provided vertically and laterally spaced apart from each other.

8. The refrigerator of claim 7, wherein the power supply includes:
   a housing in which the first socket and the second socket are formed;
   a first conductor provided at a rear of the first socket; and
   a second conductor provided at a rear of the second socket, wherein the housing includes a partition that partitions an internal space of the housing such that the first conductor and the second conductor are electrically insulated from each other.

9. The refrigerator of claim 1, wherein each terminal or each socket is provided with a guide that guides insertion of the respective terminal or the respective socket.

10. The refrigerator of claim 1, wherein the at least one shelf further includes a light guide plate that guides light of the light source to a front of the shelf, and wherein the light source is provided to extend linearly along a rear end of the light guide plate.

* * * * *